G. F. STEEDMAN.
LUBRICATING SYSTEM FOR COMPRESSORS AND SIMILAR MACHINES.
APPLICATION FILED SEPT. 26, 1914.

1,151,732.  
Patented Aug. 31, 1915.
6 SHEETS—SHEET 3.

G. F. STEEDMAN.
LUBRICATING SYSTEM FOR COMPRESSORS AND SIMILAR MACHINES.
APPLICATION FILED SEPT. 26, 1914.

1,151,732.  Patented Aug. 31, 1915.
6 SHEETS—SHEET 4.

UNITED STATES PATENT OFFICE.

GEORGE F. STEEDMAN, OF ST. LOUIS, MISSOURI.

LUBRICATING SYSTEM FOR COMPRESSORS AND SIMILAR MACHINES.

1,151,732.　　　　Specification of Letters Patent.　　Patented Aug. 31, 1915.

Application filed September 26, 1914.　Serial No. 863,747.

*To all whom it may concern:*

Be it known that I, GEORGE F. STEEDMAN, a citizen of the United States, residing at St. Louis, Missouri, have invented a certain new and useful Improvement in Lubricating Systems for Compressors and Similar Machines, of which the following is a full, clear, and exact description, such as will enable others skilled in the art to which it appertains to make and use the same.

This invention relates to lubricating systems for compressors, machines or engines of the type that comprise a reciprocating piston which operates in a vertically disposed cylinder whose lower end is open and in communication with a crank case that contains lubricating oil which is splashed or thrown upwardly by means of a device on the lower end of the connecting rod or on the crank arm which dips into the bath of oil in the crank case when the crank shaft is in rotation.

One object of my invention is to provide a lubricating system of the general type mentioned, which is so designed that the quantity of oil supplied to the cylinder can be accurately controlled, thus preventing an excessive supply of oil to the cylinder, as often occurs with the splash system now used in machines or engines of the general type mentioned which are so designed that the oil is splashed directly onto the side wall of the cylinder.

Another object is to provide a lubricating system for multiple cylinder machines of the type mentioned, wherein the quantity of oil supplied to each cylinder can be independently regulated.

Another object is to provide a lubricating system for machines or engines of the type mentioned which is so designed that sufficient oil is supplied to the crank shaft bearings, to the connecting rod bearing, and to the pin that connects the piston to the connecting rod to insure thorough lubrication of said parts. And still another object is to provide a lubricating system for machines of the general type mentioned that comprises a baffle which prevents the oil from being splashed into the open end of the cylinder, and which baffle may also act as a distributer for conducting the oil to the bearings of certain moving parts in the crank case which require lubrication.

Other objects and desirable features of my invention will be hereinafter pointed out.

I have herein illustrated my invention embodied in an air compressor, but I wish it to be understood that the invention is applicable to various other types of machines or engines that comprise a crank case or reservoir for holding a bath of oil which is adapted to be splashed or thrown upwardly by means of a device actuated by the crank shaft of the machine.

Referring to the drawings which illustrate the preferred form of my invention, A designates the cylinder of the compressor which is arranged vertically, and whose lower end is open and in communication with a crank case B that contains a bath of lubricating oil $x$, the piston C that is arranged inside of the cylinder being connected by means of a connecting rod D with a crank E on the crank shaft F of the machine.

Instead of splashing the lubricating oil directly onto the side wall of the cylinder by means of a device on the crank arm or on the lower end of the connecting rod that drips into the bath of oil in the crank case, as is now the general practice in machines or engines of the general type mentioned, I have devised a lubricating system in which a controlled quantity of oil is supplied to the cylinder, and means are provided for conducting oil to the crank shaft bearings, to the connecting rod bearing, and to the piston bearing pin. In the preferred form of my invention as herein shown, a baffle G is arranged inside of the crank case at the lower end of the cylinder A so as to protect said cylinder and also act as a distributer for oil that is thrown onto said baffle by means of one or more throwing devices 1 on the crank arm E that dip in the bath of oil x in the crank case when the crank shaft is in rotation.

In the form of my invention shown in Figs. 1 to 7, oil is supplied to the inner wall of the cylinder A from an oil-catching device or trough H that is arranged in a housing 4 on the crank case B to one side of the cylinder bore and which communicates with the interior of the cylinder. The oil-catching device H may be formed in various ways, but in the machine herein shown, said device consists of a comparatively short piece of pipe or tubing provided at one end with screw threads h that are screwed into the wall of the cylinder and at its other end with a cut-out portion or opening h' on the upper side thereof.

When the machine is in operation, oil is continuously thrown upwardly into the housing 4 by one of the throwing devices 1, and means is provided for intercepting a portion of the oil that is thrown into said housing and deflecting the same so that it will enter the trough H and be delivered to the inner wall of the cylinder A. The means for deflecting the oil consists of a blade or vane 2 secured in a frame 3 that is rotatably mounted in the housing 4. The vane 2 is preferably formed from a flat piece of metal whose lower edge is inclined downwardly and terminates at the point 2ª which is approximately on the axis of revolution of the frame 3, and which lies directly above the cut-out portion h' of the trough H. By referring to Figs. 1 to 4, it will be seen that said vane is located in such a position with respect to the trough H, that some of the oil which is thrown upwardly by one of the throwing devices 1 on the crank arm will strike against the side of said vane and be deflected or run downwardly to the point 2ª thereof, from which said oil drops off into the opening h' of the trough H. The amount of oil that is intercepted and led into the trough H by the vane 2 can be easily regulated by simply loosening the screws 3ª that connect the frame 3 to the housing 4 and then rotating said frame in one direction or the other, the portion 6 of said frame that lies outside of said housing being knurled, so as to facilitate the rotation of same. It is obvious that if the frame 3 is rotated in a clock-wise direction (assuming the crank to be rotating in the direction indicated by the arrows in Fig. 4) until the vane 2 lies approximately at right angles to the direction of throw of the oil, that a maximum amount of oil will be intercepted by said vane and delivered to the inner wall of the cylinder. If, however, said frame is rotated in a counter-clock-wise direction until the vane 2 assumes a position approximately parallel to the direction of throw of the oil, a minimum amount of oil will be intercepted and delivered to the cylinder.

Means is provided for enabling the flow of oil from the vane 2 to the trough H to be observed, said means consisting of a sight opening in the frame 3 that is covered by a piece of glass or other suitable transparent material, but it will, of course, be understood that various other means could be employed for showing the flow of oil from the vane 2 without departing from the spirit of my invention.

From the foregoing it will be seen that I have provided an extremely simple and reliable sight feed cylinder lubricating means that can be readily and accurately adjusted by the operator of the machine so as to deliver the required amount of oil to the cylinder. Owing to the extreme simplicity of construction of the sight feed device just described, there is no liability of its being rendered inoperative on account of dirt or other foreign matter that may be mixed with the oil. While I have herein described this device as being applied to a single cylinder machine, it is obvious that it is equally well adapted for use with a multi-cylinder machine, and when so used, a separate device is employed for each cylinder, thus enabling the operator to vary the quantity of oil delivered to any one cylinder independently of the other cylinders.

Figures 2, 5, 6, 7:
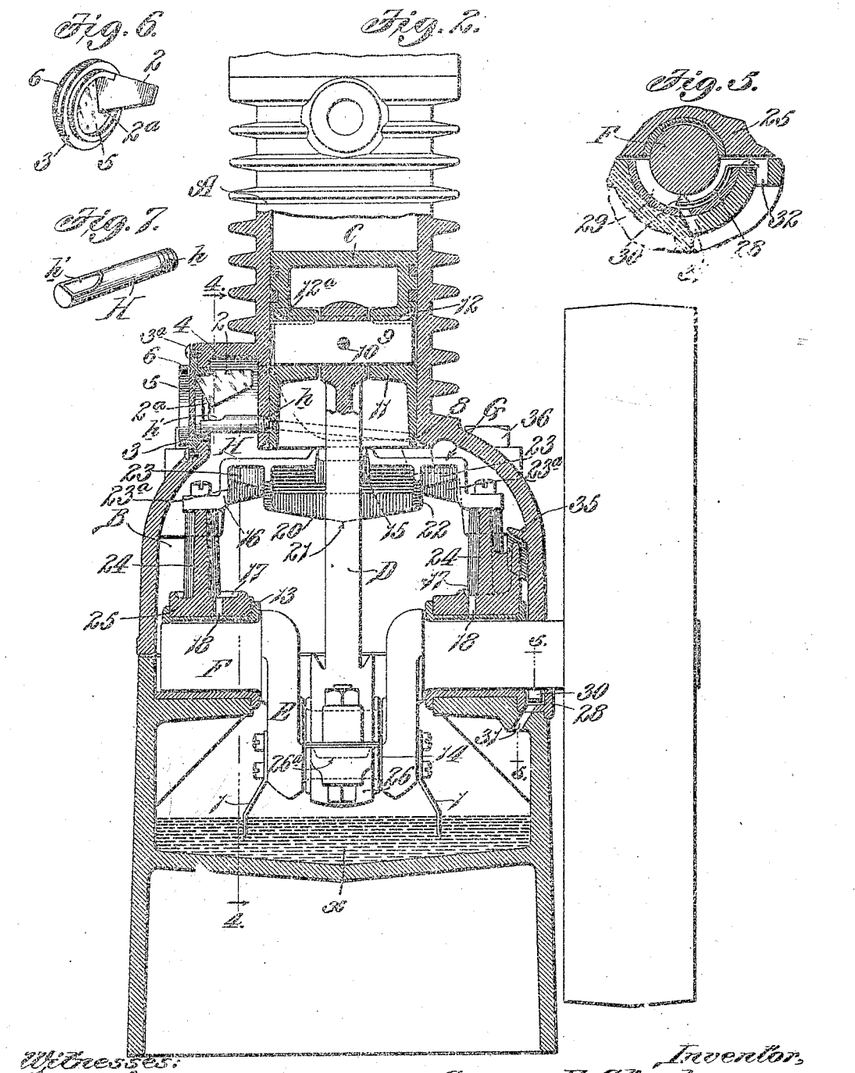
Fig. 2 is a vertical sectional view taken on the line 2—2 of Fig. 1.
Fig. 5 is a detail sectional view taken on the line 5—5 of Fig. 2.
Figs. 6 and 7 are detail perspective views of the parts that form the sight feed cylinder lubricating means.

An annular groove 8 may be formed in the outer surface of the piston C at such a point that it will aline with the oil supply device H in a certain position of the piston as shown in Fig. 2 and thus facilitate the distribution of the oil over the entire inner surface of the side wall of the cylinder. The reciprocating movement of the piston distributes sufficient oil over the inner surface of the cylinder A to keep the piston and cylinder thoroughly lubricated, and as the supply of oil to the cylinder can be controlled or regulated accurately there is no danger of the cylinder receiving an excessive supply of oil.

The piston pin 9 that connects the piston C to the connecting rod may be fastened to said connecting rod by a cotter key 10, or any other suitable means, and the end portions of said pin 9 are journaled in bearings 11 in the piston, as shown in Fig. 2. These bearings 11 are supplied with oil by means of a groove 12 formed in the outer surface of the piston C at a point above the upper side of the bearings 11, said groove 12 being preferably undercut slightly and provided with branch ducts 12ª that lead to the bearings 11 so that the oil which collects in the groove 12 will flow to the connecting pin 9 and thus keep said pin and the bearings 11 thoroughly lubricated.

Figure 1:
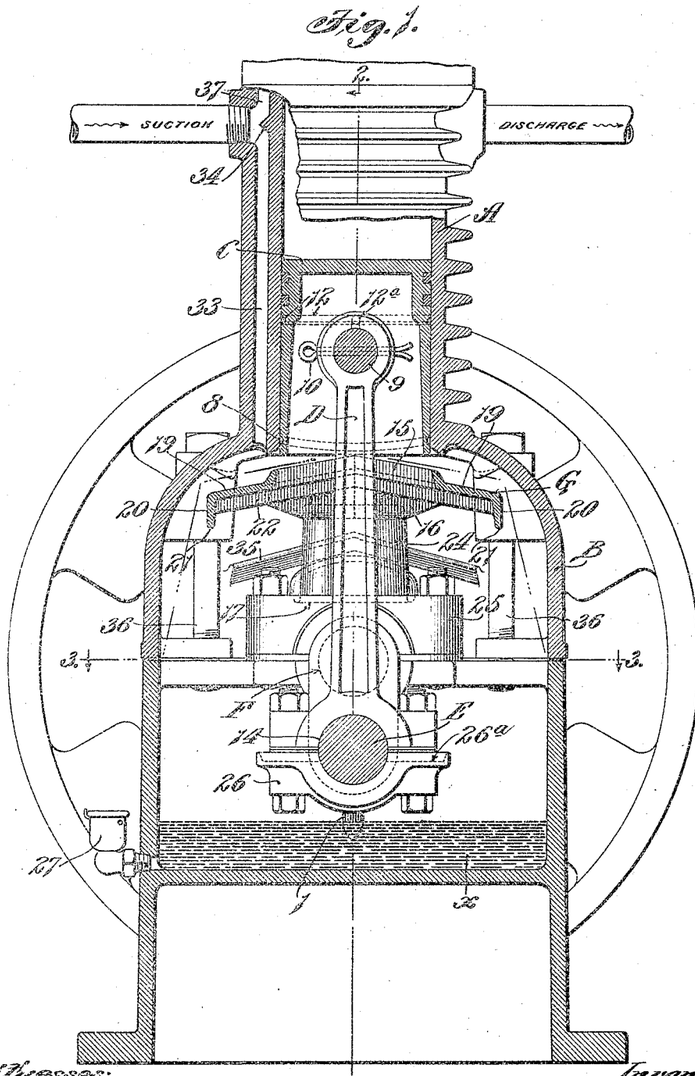
Figure 1 of the drawings is a vertical sectional view of a single cylinder compressor provided with a lubricating system constructed in accordance with my invention.
Figure 3:
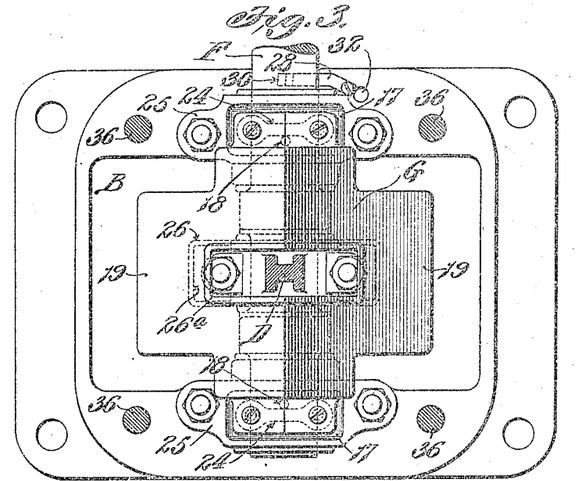
Fig. 3 is a horizontal sectional view taken on the line 3—3 of Fig. 1.
Figure 4:
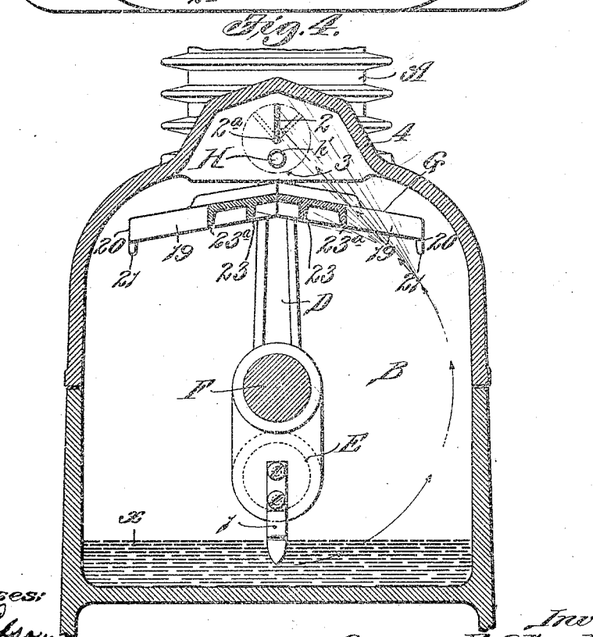
Fig. 4 is a vertical sectional view taken on the line 4—4 of Fig. 2.

The baffle G extends across the lower end of the cylinder A and above the space required for the rotation of the crank, and while it prevents the oil from being thrown or splashed upwardly onto the side walls of the cylinder by the crank arm or by any other moving parts, it does not interfere with the supply of oil thrown by the throwing device 1 into the housing 4, which is located at one side of the cylinder. Said baffle extends substantially longitudinally across the crank case, and, as previously stated, one function of said baffle may be to distribute oil to certain parts of the machine, the baffle G of the machine herein shown being so designed. It distributes oil to the crank shaft bearings 13 and to the bearing 14 of the connecting rod D. The connecting rod D passes through an opening 15 in the baffle G, and the underside of said baffle is so formed that the oil which is thrown onto same by the devices 1 or oil otherwise thrown or dripped will drain off of said baffle and supply oil to the bearings 13 and 14. Adjacent to the ends of the baffle are depending flanges or portions 16 which are located over oil cups or reservoirs 17, each of which is provided with an outlet opening 18 that leads to one of the crank shaft bearings 13, as shown in Fig. 2. The baffle G is substantially inverted V-shape in cross section, as shown in Figs. 1, 3 and 4; and on the longitudinal sides of same are extensions 19 that lie above the path of travel of the crank arm E, and between the paths of travel of the two throwing devices 1, said devices 1 being so arranged that they throw the oil onto the end portions of the baffle G at each side of the extensions 19. At the outer end of each of said extensions 19 is a depending flange 20 whose lower edge inclines downwardly from the sides of the extension to the center thereof, as shown in Fig. 2, so as to form a dripping point 21 which is in alinement with the path of travel of the bearing 14 of the connecting rod D, the oil dripping from the point 21 of the flange 20 onto the bearing 14 when the crank shaft is in operation. The extensions 19 are provided with side flanges 22 or other suitable devices that incline downwardly in opposite directions from the longitudinal center of the baffle so as to form conducting ribs on which the oil flows to the flanges 20 at the ends of the extensions 19 of the baffle. Depending flanges 23 are preferably formed on the underside of the baffle adjacent to and inclining toward the vertically disposed portions or depending flanges 22 thereof, so as to conduct the oil to the flange 20 and point 21 which lubricate the bearings 14 of the connecting rod. The baffle G may also be provided on the underside of the portions over the throwing devices with vertically disposed ribs 23ª adjacent to and inclining toward the flanges 16 which conduct the oil and lead it to the reservoir 17 and to the bearings 13. In other words, the baffle G is so arranged that it prevents the oil from being splashed into the cylinders, and the underside of the baffle is so designed that the oil which is splashed or thrown onto same will drain to certain points from which it can drip or flow into holders or reservoirs that supply the crank shaft bearings and the connecting rod bearing. By constructing the baffle G in the manner above described, it will be obvious that any oil that is thrown or drips onto the top of said baffle will drain off of same and be returned to the base portion of the crank case or will follow the guiding flanges and assist in lubricating the several bearings.

The baffle G herein shown is formed in two parts so as to enable the hole 15 in same which receives the connecting rod to be made just large enough for the intermediate portion of the connecting rod, and said baffle is split or divided on the longitudinal center of same. Said baffle can be mounted or supported in various ways without departing from the spirit of my invention, but I prefer to mount it on two uprights 24, which are integrally connected to the removable top members 25 of the split boxes which form part of the crank shaft bearings 13, the lubricating reservoirs or cups 17 which supply the bearings 13 being formed in said top members 25 and the supports 24 projecting upwardly from said reservoir 17, as shown in Fig. 2, so that the oil which drains onto said supports from the baffle G will flow downwardly into the reservoirs 17. The removable member 26 of the box that forms part of the connecting rod bearing 14, is provided with an oil holding pocket or reservoir 26ª, as shown in Fig. 1, so as to receive and collect the oil that drips off the drip points 21 on the lateral extensions of the baffle G, thus insuring a sufficient supply of oil to the connecting rod bearing 14. An oil cup 27 is mounted on the outside of the crank case adjacent the bottom of same, as shown in Fig. 1, so as to form an oil gage which shows the level of the oil in the crank case.

In order to eliminate the possibility of oil working out of the bearing 13 through which the crank shaft projects out of the crank case, I have provided means for automatically wiping off the surplus oil from the portion of the crank shaft that is journaled in said bearing. Said means consists of a spring arm 28, shown in Fig. 5, that lies in a groove 29 in the bearing 13, and which is provided at its free end with a projection or tooth 30 that bears against the underside of the crank shaft F and thus wipes off the surplus oil on said shaft which would work outwardly through the outer end of the bearing 13 if it were not removed from said shaft. The oil that the tooth or device 30 wipes off the crank shaft collects in the groove 29 and flows out of said groove back into the crank case through a duct 31 formed in the bearing and in the lower portion of the split box that incases the bearing. A similar duct 32 is also formed in the lower member of the bearing box adjacent the fixed end of the spring arm 28 so as to act as an auxiliary drain hole for the groove 29.

Communication is established between the interior of the crank case and the atmosphere by means of an opening 33 formed in the crank case adjacent the cylinder and preferably connecting said crank case with the suction opening 37 of the compressor, as shown in Fig. 1. The breathing action of the crank case, due to reciprocation of the piston, draws in air from and discharges it through the main suction pipe or port of the compressor. If this suction port 37 or an obvious equivalent is connected to clean air the compressor can operate in dusty and dirty surroundings without sucking dirt into the crank case, as would be the case if a simple opening having no connection with the suction port were made in the wall of the crank case. A breathing port is commercially necessary on single cylinder machines, otherwise the pulsation of air in the crank case would tend to force oil out of any openings—and suck in dirt or lint that would impair the efficiency of the oil. A baffle 34 is preferably provided in the port 33 adjacent to the suction pipe of the compressor so that when the governor of said compressor (not shown) automatically opens the suction valve, there will not be a sudden inrush of air to the crank case. The crank case B is preferably divided horizontally, as shown in Figs. 1 and 2, and the top portion of same is formed integrally with the cylinder A, said top portion being connected to the bottom portion of the crank case by means of bolts 36. If it becomes necessary to renew the piston rings, the cylinder and the top portion of the crank case can be removed by simply withdrawing the bolts 36, it being unnecessary to remove the baffle G, owing to the fact that said baffle is carried by supports 24 that are connected to the top members of the boxes of the main crank shaft bearings.

In a lubricating system of the character described there is no liability of the cylinder getting too much or too little oil since the quantity of oil being supplied to said cylinder can be accurately gaged, owing to the fact that a sight feed means is provided for governing the flow of oil to the inner wall of the cylinder, when the crank shaft is in operation, which makes it possible for the person who has charge of the machine to accurately regulate the supply of oil to the cylinder. When the rotation of the crank stops, the flow of oil to the cylinder stops automatically, and consequently, there is no waste of oil while the machine is idle. Some of the oil that works up the side wall of the cylinder collects in the groove in the piston which communicates with the bearings for the piston pin, thus insuring a sufficient supply of oil to the connection between the piston and the connecting rod. The baffle prevents oil from being splashed or thrown upwardly into the open, lower end of the cylinder, and said baffle also serves to conduct the oil to the reservoirs located over the crank shaft bearings, and to the reservoir formed in the box that forms part of the connecting rod bearing. Furthermore, there is no liability of the oil working out of the crank case through the bearing through which the crank shaft projects out of the crank case on account of the fact that means are provided for wiping off the surplus oil from the portion of the crank shaft that is journaled in said bearing and conducting said surplus oil back to the crank case. In addition to the desirable features above mentioned, a machine of the construction herein described can be manufactured cheaply and it can be assembled and dismantled quickly.

Figure 8:
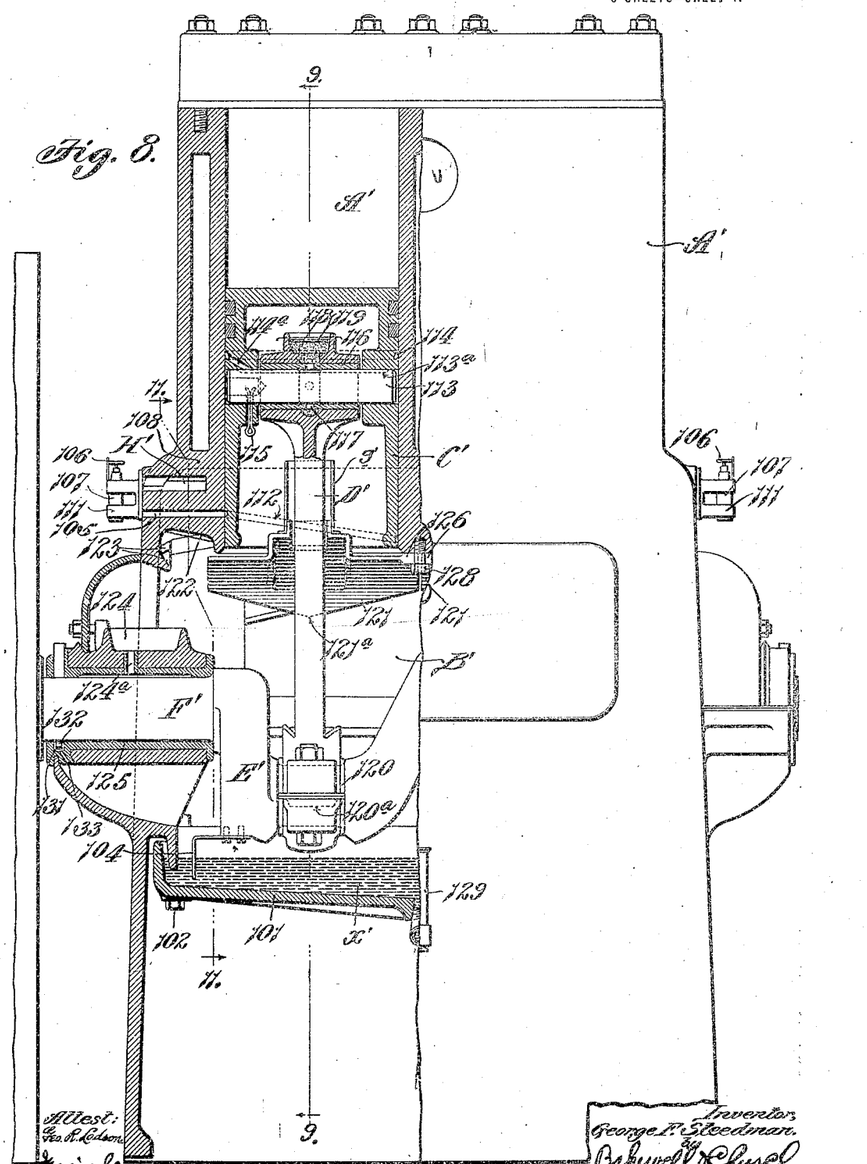
Fig. 8 is a side elevational view, partly in vertical section, of a two-cylinder compressor equipped with a lubricating system of slightly different construction than that shown in Figs. 1 to 7.
Figure 9:
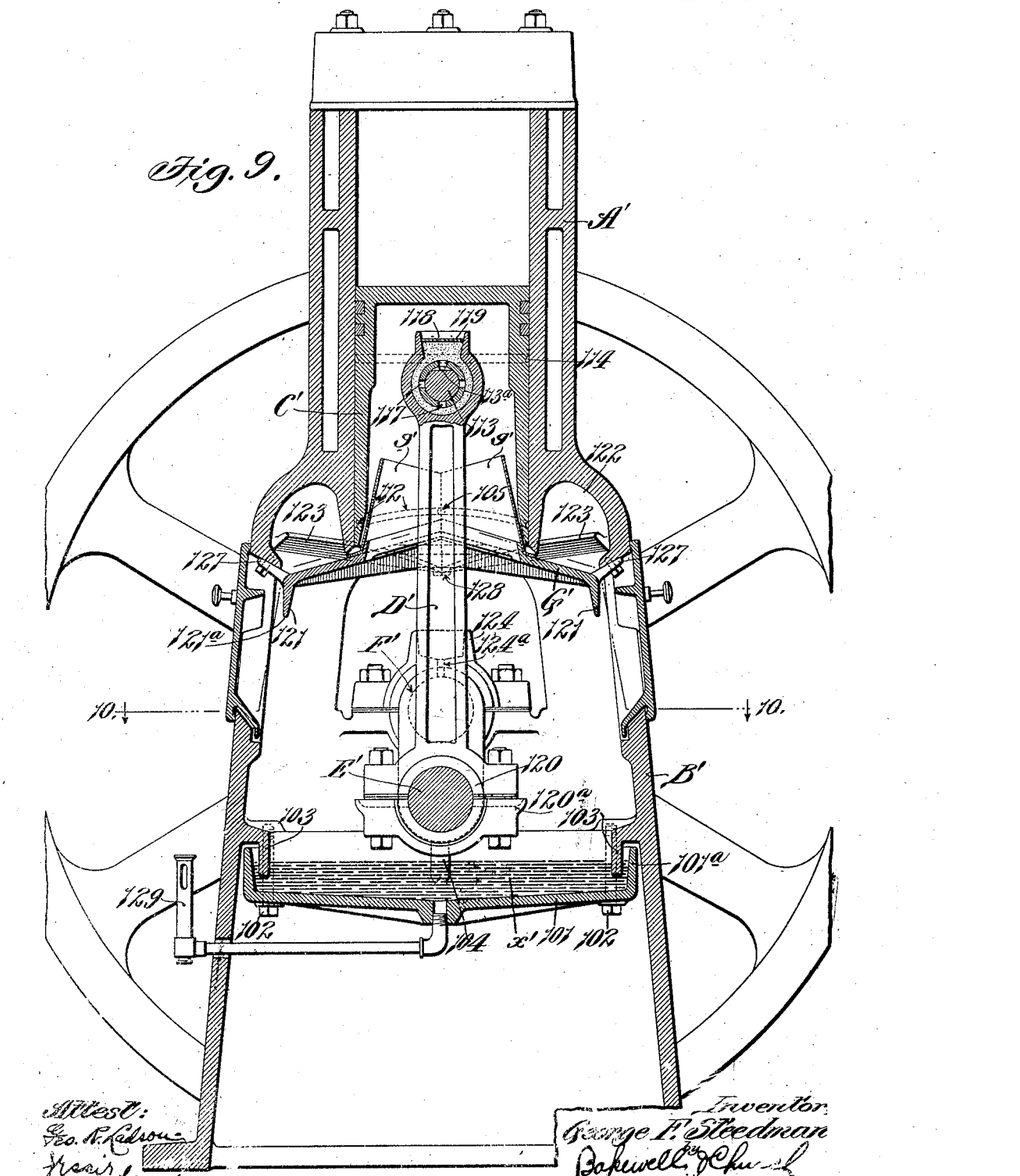
Fig. 9 is a vertical sectional view taken on the line 9—9 of Fig. 8.

In Figs. 8 to 13, inclusive, I have illustrated a slightly different form of my lubricating device, embodied in an air compressor provided with a plurality of cylinders, though I wish it to be understood that this form of my invention is equally well adapted to machines of the single cylinder type or to other types of machines besides air compressors. Referring to Figs. 8 and 9, A' designates the cylinders of the compressor which are arranged vertically, and whose lower ends are open and in communication with the crank case B' that contains a supply of lubricating oil $x'$, the piston C' that is arranged inside of each of said cylinders being connected by means of a connecting rod D' with a crank E' on the crank shaft F' of the machine. The crank case B' is preferably provided with a pan 101 for holding the supply of oil $x'$, which pan is detachably connected to the crank case by means of bolts 102, or other suitable fastening devices. On the inner side of the crank case is a depending flange 103 that projects downwardly into the pan so as to prevent the oil from splashing over the upper edge of the vertically disposed flange 101ª of the pan, and each crank arm E' of the crank shaft is provided with a throwing device 104 that dips into the bath of oil x' when the crank shaft is in rotation, and thus throws the oil upwardly onto devices which cause the oil to drain into reservoirs or oil-holders.

Figures 11, 12, 13:
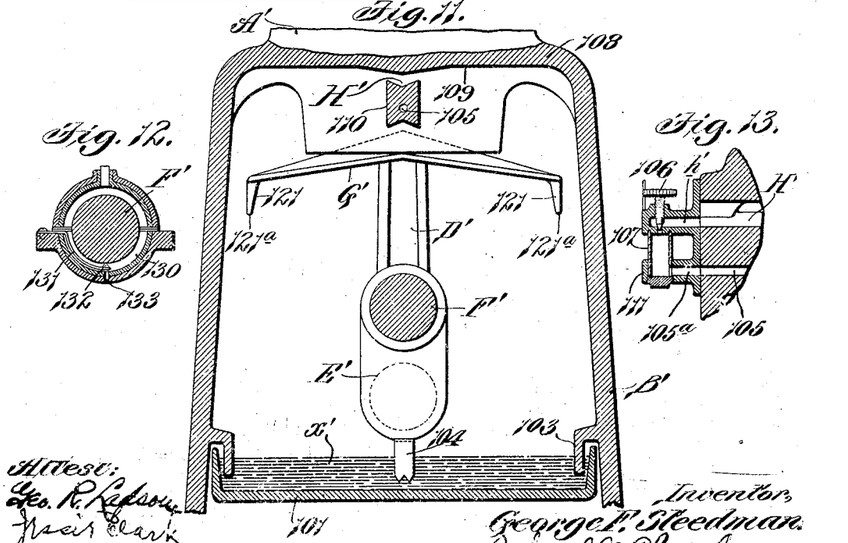
Fig. 11 is a vertical sectional view taken on the line 11—11 of Fig. 8.
Fig. 12 is a vertical sectional view taken on the line 12—12 of Fig. 10.
Fig. 13 is an enlarged detail sectional view of the sight-feed for the reservoir that supplies oil to the cylinder.

In the machine herein shown a baffle G' is arranged inside of the crank case in such a position that it prevents the oil from being thrown directly onto the side walls of the cylinders A', and a separate reservoir H' is provided for supplying oil to the side wall of each of said cylinders. A supply duct 105 coöperates with each of the reservoirs H' for conducting the oil to the side wall of the cylinder, and valves 106, preferably needle valves, are provided for controlling the flow of the oil from the reservoirs H' into the supply duct 105, the oil dripping through the port controlled by the valve 106 into a glass sight feed 107 and thence into the supply duct 105 which leads from the sight feed 107 to the side wall of the cylinder, as shown in Figs. 13 and 8. The reservoir H' of each cylinder is arranged inside of a housing 108 that communicates directly with the crank case and which is so located with relation to the particular oil-throwing device 104 that coöperates with same that the oil will be thrown upwardly into the housing onto the top wall 109 thereof, which is inclined or shaped in such a manner that the oil will drain into the reservoir H', as shown in Fig. 11. The reservoir H' may be formed conveniently by a horizontally disposed partition 110 in the housing 108, whose upper edge is provided with a groove or V-shaped depression that constitutes the reservoir H'. The oil supply duct 105 extends transversely through the partition 110, as shown in Fig. 11, and a member 111 that carries the regulating valve 106 and the sight feed 107 is secured to the side of the housing 108 in such a manner that the ducts h' and 105ª in said member 111 will aline with the reservoir H' and the supply duct 105, as shown in Fig. 13.

When the machine is in operation the throwing devices 104 on the crank shaft throw sufficient oil upwardly onto the top walls of the housings 108 to keep the reservoirs H' supplied with oil, and the adjusting valve 106 and sight feed 107 that are provided for each housing make it possible for the person in charge of the machine to accurately control or regulate the quantity of oil that is supplied to the cylinders. An annular groove 112 may be formed in the outer surfaces of each piston at such a point that it will line up with its coöperating oil supply duct 105 when the piston is in a certain position, and thus receive oil which is distributed over the side wall of the cylinder when the piston reciprocates, the groove 112 being preferably inclined transversely of the piston, as shown in dotted lines in Fig. 8, so that the oil which enters the groove from the supply duct 105 will flow to the lower side of the groove and thus be distributed over the entire inner surface of the side wall of the cylinder. In view of the fact that the supply of oil to each cylinder of the machine can be controlled or regulated accurately and independently, there is no danger of the cylinders receiving an excessive supply of oil, or being insufficiently lubricated.

The piston pin 113 that connects each piston to its coöperating connecting arm is kept thoroughly lubricated at all times. In the embodiment of my invention herein shown an annular groove 114 is formed in the piston so as to collect oil from the side wall of the cylinder when the piston reciprocates, and a branch duct 114ª is provided for carrying the oil from the groove 114 to the pin 113. The pin 113 is preferably fastened to the piston by means of a cotter key 115 or other suitable device, so as to prevent it from turning with relation to the connecting rod, and a groove 113ª is formed in said pin 113, so that oil will enter same from the branch duct 114ª and travel longitudinally over the upper side of the pin. A bushing 116 which surrounds the pin 113 is provided with a plurality of holes 117, and an annular chamber is formed in the portion of the connecting rod D' through which said bushing passes, so as to receive waste or wicking 118 which is kept thoroughly saturated with the oil that is supplied through the groove 113ª in the top side of the pin 113. The oil that is supplied to the wicking 118 passes through the holes 117 in the bushing 116, and thus keeps the inner surface of the bushing and the outer surface of the pin 113 thoroughly lubricated, and in view of the fact that the wicking 118 is thoroughly saturated with oil, there is no liability of the bushing not having sufficient oil when starting up in a new machine or after a machine has been shut down for a long time. In other words, the lubricating system is so designed that the pin that connects the piston and connecting rod together is kept supplied with oil by means of an oil-saturated device that retains its supply of oil, even when the machine is not in operation. The portion of the connecting rod through which the bushing 116 passes, is provided at its upper end with a hole through which the wicking or packing can be introduced into the annular chamber 117, said hole being normally closed by a cap plate 119, as shown in Figs. 8 and 9.

The baffle G' is so arranged and designed that it lies out of the path described by the throwing devices 104 on the crank shaft, and while one function of said baffle is to prevent oil from being thrown into the cylinders by the devices 104, or by other parts of the crank shaft that become covered with oil, said baffle also performs another function, namely, it distributes oil to the connecting rod bearings 120, each of which is preferably provided with a reservoir or cup 120ᵃ, as shown in Fig. 9. The baffle G' extends longitudinally of the crank case and is arched or substantially inverted V-shape in cross section, as shown in Fig. 9. At the longitudinal side edges of said baffle are depending flanges 121 that are substantially V-shaped or whose lower edges are oppositely inclined, as shown in Fig. 8, so as to form a dripping point 121ᵃ on each flange which is in alinement with the path of travel of the connecting rod bearing 120, the baffle herein shown being provided with four of such flanges 121 so that two dripping points are provided on the baffle for each connecting rod bearing. Any oil that is thrown onto the underside of the baffle will drain to the depending flanges 121 at the sides thereof, and in view of the fact that the lower edges of said flanges are inclined in opposite directions so as to form dripping points 121ᵃ, the oil will eventually work to the points 121ᵃ of the baffle and thus drip onto the connecting rod bearings when the crank shaft is in operation. The oil that drips onto the top side of the baffle from the lower ends of the cylinders or from the upper side of the crank case whose end portions 122 are inclined downwardly toward the baffle, as shown in Fig. 8, will flow over the top side of the baffle and eventually work to the dripping points 121ᵃ. It will thus be seen that when the machine is in operation oil will be supplied continually to the connecting rod bearings 120 from the baffle G', which is so designed that any oil which collects on either the top or bottom side of same will eventually work to the dripping points 121ᵃ of the baffle which are located in alinement with the path of travel of the connecting rod bearings 120.

On the end walls of the crank case are flanges 123 that incline downwardly from the sides of the crank case toward the longitudinal center of same, as shown in Fig. 9, so as to form gutters for receiving oil which is splashed or thrown into same, or which drains into same from the top wall of the crank case when the machine is in operation. The gutters 123 are so formed that the oil which collects in same will drain out of the lower ends of the gutters, and each of said gutters is arranged above the oil reservoir 124 that supplies oil to one of the crank shaft bearings 125 through an outlet port 124ᵃ that leads from the reservoir to the crank shaft bearing, as shown in Fig. 1. The oil reservoirs 124 may be formed in various ways, but I prefer to form each of said reservoirs in the removable top member of the box that surrounds the particular crank shaft bearing with which the reservoir coöperates.

Figure 10:
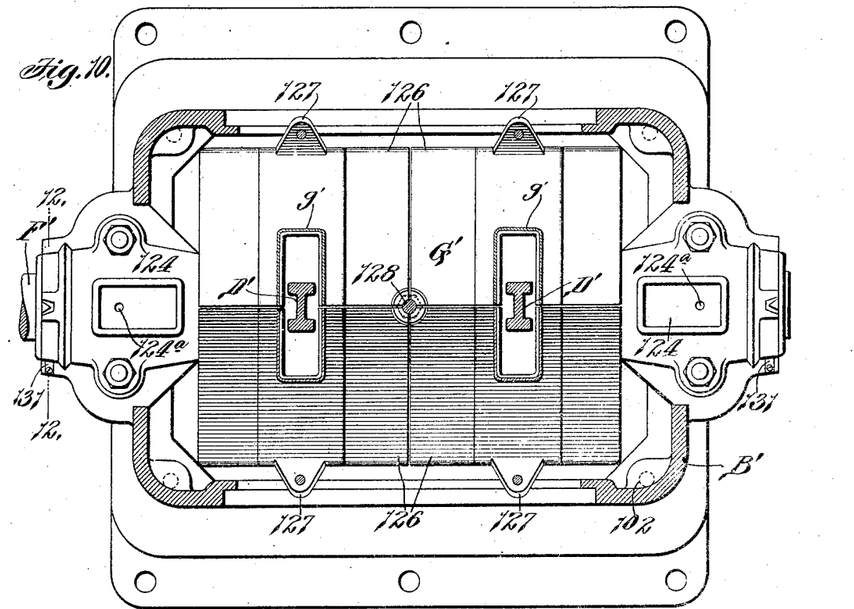
Fig. 10 is a horizontal sectional view taken on the line 10—10 of Fig. 9.

The baffle G' is provided with elongated slots through which the connecting rods pass, as shown in Fig. 10, and said baffle is preferably formed from four members 126 arranged in the manner shown in Fig. 10, and each being provided at its side edge with a flange 127 that is bolted or connected in any other suitable manner to the top portion of the crank case. At the point where the four inner corners of the members 126 meet a bolt 128 passes through notches formed in said members, as shown in Figs. 8 and 10, and thus securely clamps them to the dividing wall between the two cylinders of the machine. In order to eliminate the possibility of oil getting into the cylinders through the openings through which the connecting rods pass, I provide extensions or guides g' that surround said openings and connecting rods and which extend upwardly from the baffle G' far enough to prevent oil from being thrown through said openings by the cranks E' or any other moving parts.

An oil gage 129 that is arranged outside of the crank case, is provided for indicating the level of the oil in the pan 101 of the crank case, and means similar to that heretofore described is provided for wiping off or removing the surplus oil from the portions of the crank shaft that are journaled in the crank shaft bearings 125, so as to prevent the oil from working out of the crank case through said bearings. In the embodiment of my invention here shown each of the crank shaft bearings 125 is provided adjacent the outer end of same with an annular groove 130 in which is arranged a spring arm 131 provided with a wiping device 132 that bears against the underside of the crank shaft, as shown in Fig. 12, and thus wipes the surplus oil off the shaft, drain-holes 133 being provided in the bearings so as to permit the surplus oil to drain back into the crank case.

With a lubricating system of the character just described the supply of oil to each cylinder of a multi-cylinder machine can be controlled independently and accurately, and consequently, there is no liability of the cylinders receiving too much or too little oil. The desirable features of a splashing system are attained without the objectionable features of the splash systems now in general use, owing to the fact that the baffle G' prevents oil from being splashed or thrown directly onto the side walls of the cylinders of the machine; and, furthermore, adequate lubrication of the crank shaft bearings and the connecting rod bearings is insured, owing to the fact that means are provided for conducting oil to oil reservoirs or cups that supply said bearings. In the forms of my invention herein described, I have shown that the oil that flows to the main bearings and connecting rod bearings is all collected on the baffle, but it is obvious that the oil that is thrown on the walls of the crank case by the throwing devices could be led by other suitable means to said bearings.

One very desirable feature of the lubricating system herein described is the fact that the baffle intercepts the oil that is thrown upwardly by the moving parts in the crank case and leads a certain quantity of said oil, that is, that quantity that is thrown by the throwing devices 4 or 104, to points requiring lubrication, said baffle being so designed that all surplus oil is led by the ribs or vanes thereon to approximately the outer corners thereof, where it drops back into the bath of oil without touching any moving parts. With a system of the character above described a machine can be operated in a much cleaner manner and with a minimum amount of oil, owing to the fact that only certain parts in the crank case are utilized to supply oil to the parts requiring lubrication, all the oil that is thrown upwardly by the other moving parts in the crank case being returned to the supply, thus preventing unnecessary swirling of oil in the crank case or too much lubrication to the moving parts therein.

Having thus described my invention, what I claim as new and desire to secure by Letters Patent is:

1. In a machine of the character described, a cylinder, a piston in said cylinder, means that is adapted to hold a bath of lubricating oil, a stationary member for holding oil that is supplied to the cylinder, and means actuated by the crank shaft of the machine that dips into the bath of oil and delivers the oil to said member.

2. In a machine of the character described, a cylinder, a piston in said cylinder, a crank case that is adapted to hold a bath of lubricating oil, a trough for holding oil that is supplied to the cylinder, means actuated by the crank shaft of the machine that dips into the bath of oil in the crank case and throws said oil into said trough, and means for regulating or controlling the flow of oil from said trough to the cylinder.

3. In a machine of the character described, a cylinder, a piston in said cylinder, a crank case that is adapted to hold a supply of lubricating oil, a trough for holding oil that is supplied to the cylinder, means actuated by the crank shaft of the machine that dips into the supply of oil in the crank case and throws said oil into said trough, means for regulating or controlling the amount of oil that is fed to said trough, and means for enabling the feed of oil to said trough to be observed so as to accurately govern the supply of oil to the cylinder.

4. In a machine of the character described, a cylinder, a piston in said cylinder, means that is adapted to hold a bath of lubricating oil, a stationary member arranged at a higher level than the bath of oil in said means, means for throwing the oil constituting said bath upwardly into said member, and means for conducting the oil from said member to the piston in said cylinder so as to lubricate said piston and the side wall of the cylinder.

5. In a machine of the character described, a cylinder, a piston in said cylinder, means that is adapted to hold a bath of lubricating oil, a stationary device arranged at a higher level than the bath of oil in said means, means for throwing the oil in said means upwardly into said device, means for conducting the oil from said device to the piston in said cylinder so as to lubricate said piston and the side wall of the cylinder, and means for regulating the amount of oil that is supplied to the cylinder and piston.

6. In a machine of the character described, a cylinder, a piston in said cylinder, a crank case that is adapted to hold a bath of lubricating oil, a housing arranged above the bath of oil in the crank case, an oil holder in said housing, a device actuated by the crank shaft of the machine that dips into the bath of oil in the crank case and throws it upwardly into said oil holder, and means for varying the amount of oil that is received by said oil holder, irrespective of the speed of the machine.

7. In a machine of the character described, a cylinder, a piston in said cylinder, a crank case that is adapted to hold a bath of lubricating oil, oil reservoirs for supplying oil to the cylinder and to the crank shaft bearings of the machine, and a throwing device actuated by the crank shaft that dips into the bath of oil in the crank case and thus supplies oil to said reservoirs.

8. In a machine of the character described, a cylinder, a piston in said cylinder, a crank case that is adapted to hold a bath of lubricating oil, separate reservoirs for supplying oil to the cylinder, to the crank shaft bearings, and to the connecting rod bearing, and a throwing device actuated by the crank shaft that dips into the bath of oil in the crank case and thus conducts oil to said reservoirs.

9. In a machine of the character described, a cylinder, a sight feed lubricating device for said cylinder, a member that is adapted to hold a bath of lubricating oil, and means actuated by the crank shaft of the machine that dips into the oil bath and supplies the oil to said sight feed cylinder lubricating device.

10. In a lubricating system for trunk piston machines of the character described, an adjustable feed cylinder lubricating device, a lubricating oil bath, means for preventing the direct throwing of oil onto the cylinder walls or piston, and oil-throwing means actuated by the crank shaft for supplying oil to said adjustable feed cylinder lubricating device.

11. In a lubricating system for trunk piston machines of the character described, an adjustable feed cylinder lubricating device, an oil distributing means for lubricating the bearings of the machine, a lubricating oil bath, means for preventing oil from being thrown directly onto the cylinder walls or piston, and oil-throwing means actuated by the crank shaft for supplying oil to said adjustable feed cylinder lubricating device, and to the distributing means that lubricates the bearings of the machine.

12. In a trunk piston machine, the combination of a cylinder, a stationarily-mounted lubricator that supplies oil to an opening in the wall of the cylinder, a member for holding an oil bath, a crank shaft, and an oil thrower actuated by said crank shaft for splashing or throwing the oil in said bath into said cylinder lubricator.

13. In a trunk piston machine, the combination of a cylinder, a lubricator for the cylinder, a member for holding an oil bath, a crank shaft, an oil thrower actuated by said crank shaft for supplying the oil in said bath to said cylinder lubricator, and means for governing the quantity of oil supplied by said lubricator.

14. In a machine of the character described, a cylinder, an oil bath holder, a crank shaft, an adjustable lubricator for the cylinder, a device actuated by the crank shaft for delivering oil from the oil bath to said lubricator, and a baffle for preventing oil from being thrown directly onto the cylinder walls.

15. In a machine of the character described, a cylinder, an oil bath holder, a crank shaft, an adjustable lubricator for the cylinder, a device actuated by the crank shaft for delivering oil from the oil bath to said lubricator, and a baffle for preventing oil from being thrown directly onto the cylinder walls, said baffle being provided with distributing means that conveys oil to certain bearings of the machine.

16. In an air compressor lubricated from an oil bath, oil throwers actuated by the crank shaft for supplying oil to the cylinder of the machine, a baffle for preventing oil from being thrown directly onto the cylinder walls, and a breathing connection between the crank case and the suction pipe of the machine.

17. In a lubricating system for trunk piston machines of the character described, a lubricating oil bath arranged inside of the crank case, oil-throwing means actuated by the crank shaft, an adjustable oil-catching device arranged in said crank case for supplying oil to the cylinder of the machine, and means whereby the action of said oil-catching device can be observed from the outside of said crank case.

18. In a lubricating system for trunk piston machines of the type described, a lubricating oil bath in the crank case of the machine, an adjustable oil-catching device for supplying oil to the cylinder of the machine, means actuated by the crank shaft of the machine for supplying oil to said oil-catching device, and a sight opening in said crank case whereby the operation of said oil-catching device can be observed.

19. In a lubricating system for air compressors, a lubricating oil bath arranged in the crank case thereof, an adjustable sight feed oiling device for the cylinder, oil-throwing means actuated by the crank shaft of the machine that dips into said bath of oil and throws oil in a vertical plane at one side of the cylinder bore to said cylinder oiling device, a baffle plate that excludes any thrown oil from entering directly into the cylinder bore and which distributes thrown oil to certain bearings of the machine, and a port connecting the crank case of the machine with the suction port so as to prevent oil from being blown out of said crank case or dirt from being sucked into same.

20. In a machine of the character described that is lubricated from a bath of oil in the crank case, means actuated by the crank shaft for throwing oil in a vertical plane at one side of the cylinder bore, a housing on said crank case in alinement with said throwing plane, means in said housing for intercepting a portion of the thrown oil, and means for conveying the intercepted oil to the interior of the cylinder.

21. In a machine of the character described that is lubricated from a bath of oil in the crank case, means actuated by the crank shaft for throwing oil in a vertical plane at one side of the cylinder bore, a housing on said crank case in alinement with said throwing plane, means in said housing for intercepting a portion of the thrown oil, means for conveying the intercepted oil to the interior of the cylinder, and a sight opening in said housing.

22. In a machine of the character described, a bath of lubricant arranged in the crank case thereof, means actuated by the crank shaft for throwing oil in a vertical plane at one side of the cylinder bore, a housing on said crank case arranged in alinement with said throwing plane, means for intercepting a greater or lesser quantity of the thrown oil, and means for conveying said intercepted oil to the interior of the cylinder.

23. In a machine of the character described, a vertically disposed cylinder, a crank case, a housing on said crank case located at one side of said cylinder, means actuated by the crank shaft of the machine for throwing oil into said housing, an oil-catching device arranged in said housing and communicating with the interior of said cylinder, and a rotatable vane that lies above said oil-catching device and directs a portion of the thrown oil into said oil-catching device.

24. In a machine of the character described, a cylinder, a rotatable crank shaft, a crank case containing a bath of lubricating oil, a housing arranged in said crank case at one side of the cylinder, means actuated by the crank shaft for throwing oil upwardly into said housing, a circular frame rotatably mounted in said housing, a vane carried by said frame, and an oil-catching device arranged underneath said vane and communicating with the interior of said cylinder.

25. In a machine of the character described, a cylinder, a crank case containing a bath of lubricating oil, a housing integral with said crank case and arranged at one side of said cylinder, a tube arranged in said housing and communicating with the interior of said cylinder, said tube having an opening on its upper side adjacent to its outer end, an adjustable deflecting device arranged in said housing above said tube and having a dripping point located over the opening in said tube, and means actuated by said crank shaft for throwing oil against said deflecting device.

26. In a machine of the class described lubricated from a bath of oil in the crank case, a baffle plate excluding any oil being thrown directly into the cylinder bore, oil-throwing means actuated by the crank shaft, a cylinder-lubricating means consisting of an oil-catching vane adjustable in angularity to the line of throw of the oil droplets thrown by the throwing means, said vane being provided with a point from which all oil caught by the vane drips, means for observing the drip of oil from said point, and means for conducting the oil drops to the cylinder wall.

27. In a machine of the character described, a crank case that is adapted to hold a bath of lubricating oil, a vertically disposed cylinder whose lower end is open and in communication with said cylinder, a baffle interposed between the open end of the cylinder and said bath of oil for protecting the cylinder and for distributing oil to certain moving parts in the crank case that require lubrication, and means for throwing oil onto said baffle.

28. In a machine of the character described, a crank case that is adapted to hold a bath of lubricating oil, a vertically disposed cylinder whose lower end is open and in communication with said cylinder, a baffle interposed between the open end of the cylinder and said bath of oil for protecting the cylinder and for distributing oil to certain moving parts in the crank case that require lubrication, a trough for supplying oil to the cylinder, and means actuated by the crank shaft of the machine that dips into said bath of oil and throws it upwardly into said trough and onto said baffle.

29. In a machine of the character described, a crank case that is adapted to hold a bath of lubricating oil, a vertically disposed cylinder whose lower end is open and in communication with said cylinder, a baffle interposed between the open end of the cylinder and said bath of oil for protecting the cylinder and for distributing oil to certain moving parts in the crank case that require lubrication, a trough for supplying oil to the cylinder, means actuated by the crank shaft of the machine that dips into said bath of oil and throws it upwardly into said trough and onto said baffle, and means for regulating the flow of oil from said trough to the cylinder.

30. In a machine of the character described, a cylinder, a piston in said cylinder, a connecting rod for actuating said piston, a crank case that is adapted to hold a bath of lubricating oil, a trough for supplying oil to the side wall of the cylinder, a throwing device actuated by the crank shaft of the machine for delivering oil from the crank case to said trough, and means on the piston for removing oil from the side wall of the cylinder and supplying said oil to the connection between said piston and connecting rod.

31. In a machine of the character described, a cylinder, a piston in said cylinder, a connecting rod for actuating said piston, a crank case that is adapted to hold a bath of lubricating oil, a trough for supplying oil to the side wall of the cylinder, a throwing device actuated by the crank shaft of the machine for delivering oil from the crank case to said trough, and a groove in the outer surface of said piston which collects oil from the side walls of the cylinder.

32. In a machine of the character described, a crank case that is adapted to hold a bath of lubricating oil, a vertically disposed cylinder whose lower end is open and in communication with said crank case, a crank shaft, a connecting rod for connecting the piston to said crank shaft, a baffle arranged at the lower end of said cylinder, and means for splashing oil onto said baffle, said baffle having portions which cause the oil splashed onto said baffle to drip into the path of travel of the connecting rod bearing.

33. In a machine of the character described, a crank case that is adapted to hold a bath of lubricating oil, a vertically disposed cylinder whose lower end is open and in communication with said crank case, a crank shaft, a connecting rod for connecting the piston to said crank shaft, a baffle arranged at the lower end of said cylinder, means for splashing oil onto said baffle, and means on said baffle for conducting the oil that is splashed onto same to a point from which the oil drips onto the connecting rod bearing, and means for lubricating said cylinder.

34. In a machine of the character described, a crank case that is adapted to contain a supply of lubricating oil, a vertically disposed cylinder whose lower end is open and in communication with said crank case, a piston in said cylinder, a connecting rod for connecting said piston to the crank shaft of the machine, separate and distinct reservoirs or oil-holders for supplying oil to the side wall of the cylinder and to the connecting rod bearing, gravity-feed devices coöperating with each of said reservoirs, means for throwing the oil in the crank case onto said gravity-feed devices, and means for preventing the oil from splashing into the open lower end of the cylinder.

35. In a machine of the character described, a crank case that is adapted to contain a supply of lubricating oil, a vertically disposed cylinder whose lower end is open and in communication with said crank case, a piston in said cylinder, a connecting rod for connecting said piston to the crank shaft of the machine, separate and distinct reservoirs or oil-holders for supplying oil to the side wall of the cylinder and to the connecting rod bearing, gravity-feed devices cooperating with each of said reservoirs, means for splashing the oil in the crank case onto said gravity-feed devices, means for preventing the oil from splashing into the open lower end of the cylinder, and means for removing oil from the side wall of the cylinder and supplying it to the connection between the piston and the connecting rod.

36. In a machine of the character described, a crank case that is adapted to contain a supply of oil, a vertically disposed cylinder whose lower end is open and in communication with the crank case, a throwing device on the crank shaft of the machine located out of vertical alinement with the cylinder, and an oil-supplying device for the cylinder which is kept supplied with oil by means of said throwing device.

37. In a machine of the character described, a crank case that is adapted to contain a bath of oil, a vertically disposed cylinder whose lower end is open and in communication with the crank case, a throwing device on the crank shaft of the machine located out of vertical alinement with the cylinder, an oil-supplying device for the cylinder which is kept supplied with oil by means of said throwing device, and a baffle interposed between the cylinder and the bath of oil in the crank case and provided with a lateral extension for causing oil to drip into the path through which the bearing of the connecting rod travels.

38. In a machine of the character described, a crank case that is adapted to contain a supply of oil, a vertically disposed cylinder whose lower end is open and in communication with the crank case, a throwing device on the crank shaft of the machine located out of vertical alinement with the cylinder, and a substantially arched baffle arranged above the crank shaft for protecting the cylinder and provided at its side edges with depending flanges that incline downwardly to dripping points located in the vertical plane through which the bearing of the connecting rod travels.

39. In a machine of the character described, a crank case that is adapted to contain a supply of oil, a crank shaft provided with a throwing device, oil reservoirs for supplying oil to the bearings of the crank shaft, and a baffle arranged above the crank shaft for distributing oil to said reservoirs.

40. In a machine of the character described, a cylinder, a crank case that is adapted to contain a supply of oil, a crank shaft provided with a throwing device, oil reservoirs for supplying oil to the bearings of the crank shaft, a baffle arranged above the crank shaft for distributing oil to said reservoirs, said baffle being provided with means for causing oil to drip onto the connecting rod bearing when the crank shaft is in operation, and means for lubricating said cylinder.

41. In a machine of the character described, a cylinder, a crank case that is adapted to contain a bath of lubricating oil, a crankshaft provided with a throwing device that dips into said bath of oil when the crank shaft is in operation, a substantially inverted V-shaped baffle arranged over said crank shaft, means on said baffle for causing oil to drain to dripping points that are located in the vertical plane through which the connecting rod bearing travels, and means for collecting a portion of the oil thrown by said throwing devices and conveying same to said cylinder.

42. In a machine of the character described, a crank case comprising a lower portion and a removable top portion, a vertically disposed cylinder carried by the top portion of the crank case and having its lower end open, an oil-throwing device actuated by the crank shaft of the machine, a baffle carried by the lower portion of the crank case for preventing oil from being splashed into the cylinder, and means for collecting a portion of the oil that is thrown by said throwing devices and conveying same to said cylinder.

43. In a machine of the character described, a crank case comprising a lower portion and a removable top portion, a vertically disposed cylinder carried by the top portion of the crank case and having its lower end open, an oil-throwing device actuated by the crank shaft of the machine, bearing caps for the crank shaft of the machine provided with oil reservoirs, supports or standards on said bearings, and a baffle on said standards that extends across the open end of the cylinder.

44. In a machine of the character described, a crank case that is adapted to contain a supply of lubricating oil, a vertically disposed cylinder whose lower end is open and in communication with the crank case, a crank shaft provided with an oil-throwing device, a baffle arranged between said cylinder and crank shaft, a connecting rod that passes through an opening in said baffle, an inclined surface in the upper portion of the crank case that delivers oil to the top side of baffle, and means on the baffle for delivering oil to the bearing of the connecting rod.

45. In a machine of the character described, a crank case that is adapted to hold oil, a vertically-disposed cylinder whose lower end is open and in communication with the crank case, a throwing device on the crank shaft of the machine that dips into said oil, a cylinder lubricator which is supplied with oil by said device, a baffle that protects the open end of the cylinder, and shaft bearing lubricators which are supplied with oil from said baffle.

46. In a machine of the character described, a crank case that is adapted to contain a supply of lubricating oil, a vertically disposed cylinder whose lower end is open and in communication with said crank case, a crank shaft provided with an oil-throwing device, a piston in said cylinder, a connecting rod pivotally connected to said piston, a baffle for preventing the oil from being splashed directly into the cylinder, an oil reservoir for supplying oil to the side wall of the cylinder, and means for lubricating the connection between the piston and connecting rod.

47. In a machine of the character described, a crank case adapted to contain a bath of oil, a cylinder arranged above said crank case, a throwing device in the crank case that dips into said oil bath and transfers oil from said bath to said cylinder, and means for regulating the quantity of oil that is supplied to said cylinder.

48. In a machine of the character described, a crank case adapted to contain a bath of oil, a cylinder arranged above said crank case, a throwing device in the crank case that dips into said oil bath and transfers oil from said bath to said cylinder, and means for regulating the quantity of oil that is supplied to said cylinder while the machine is in motion.

49. In a machine of the character described, a crank case provided with a bath of oil, a cylinder arranged above said crank case, a sight feed lubricating device for said cylinder, and a device actuated by the crank shaft that is adapted to dip into said oil bath and throw the oil into said lubricating device.

50. In a machine of the character described, a crank case provided with a bath of oil, a cylinder arranged above said crank case, an adjustable sight feed lubricating device for said cylinder, and a device on the crank shaft of the machine that transfers oil from said bath to said adjustable sight feed lubricating device.

51. In a lubricating system for machines of the character described having a supply of lubricating oil in the crank case thereof, a device on the crank shaft for throwing oil upwardly in said crank case, and means on the cylinder of the machine for catching a portion of the oil thrown by said device and leading said oil to the interior of said cylinder.

52. In a machine of the character described that is lubricated from a supply of oil in the crank case, a baffle arranged in the upper portion of said crank case so as to intercept the oil that is thrown upwardly by the moving parts in said crank case, means on said baffle for conveying a certain quantity of the intercepted oil to certain moving parts requiring lubrication, and means for returning all other intercepted oil to the bath or supply in said crank case.

53. In a machine of the class described, a crank case, a crank shaft that projects through said crank case, a bearing in said case for said shaft, means for lubricating said bearing, and a wiping device that removes the surplus oil from the crank shaft and thus prevents the oil from escaping from the crank case, said wiping device consisting of a resilient member arranged in a groove in said bearing and provided with a tooth that bears upon said shaft.

In testimony whereof I hereunto affix my signature in the presence of two witnesses, this twenty second day of September 1914.

GEORGE F. STEEDMAN.

Witnesses:
Leon S. Buckles,
L. P. Lessard.